United States Patent Office 2,832,785
Patented Apr. 29, 1958

2,832,785

HETEROCYCLE AMINOALCOHOL ESTERS OF N-SUBSTITUTED PIPERIDINE CARBOXYLIC ACIDS

John H. Biel, Milwaukee, Wis., assignor to Lakeside Laboratories, Inc., a corporation of Wisconsin No Drawing. Application September 28, 1955
Serial No. 537,276

8 Claims. (Cl. 260—294.3)

This invention relates to the production of novel chemical compounds. More particularly, this invention is concerned with novel derivatives of piperidine carboxylic acids.

According to the present invention, there is provided novel heterocycle aminoalcohol esters of N-substituted piperidine carboxylic acids (III) of the formula

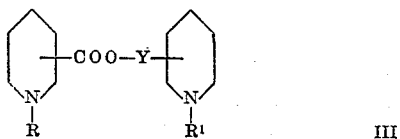

wherein R and $R^1$ are the same or different alkyl or aralkyl groups, particularly lower alkyls and lower alkylphenyl and substituted phenyl groups, and Y is a straight or branched chain alkylene, preferably a lower alkylene of 1 through 10 carbons although Y may also be only a connecting bond, and acid addition and quaternary ammonium salts thereof.

Such compounds may be conveniently produced by contacting a lower alkyl ester of an N-substituted piperidine carboxylic acid (I) with an N-substituted piperidine alcohol (II). This reaction may be conveniently represented as follows

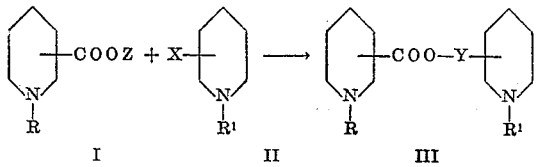

wherein R, $R^1$ and Y have the significance previously assigned and X is hydroxyl or an alkanol group in which the alkyl is a straight or branched chain, preferably from 1 through 10 carbons and Z is an alkylene group, preferably of 1 through 10 carbons.

Some N-alkylpiperidine carboxylic acids that may be used in this process in the form of their esters are N-alkylpipecolinic acid (—COOH in 2 position), N-alkylnipecotic acid (—COOH in 3 position), and N-alkylisonipecotic acid (—COOH in 4 position) wherein the N-alkyl group may be groups such as the methyl, ethyl, propyl, butyl, sec-butyl and other alkyl groups, saturated and unsaturated and straight and branched chained. In place of the N-alkyl substituent there may be an N-aralkyl group such as N-benzyl, N-phenethyl and the like including such groups in which the phenyl nucleus is otherwise substituted as with a halogen, nitro, or alkoxy group and the like. Lower alkyl esters are preferably used in the reaction.

Some N-substituted piperidine alcohols which may be named that are useful in producing the compounds of this invention are the N-alkyl and N-aralkyl 3-hydroxy or 4-hydroxy piperidines such as 3-hydroxymethyl-piperidine, 3-(2-hydroxyethyl)-piperidine, 2-(4-hydroxybutyl)-piperidine, 4 - (7-hydroxyheptyl)-piperidine, 3 - (10-hydroxydecyl) - piperidine, 3 - (2 - hydroxyethyl) - piperidine and 3-(3-hydroxypropyl)-piperidine, the N-alkyl and N-aralkyl groups being such as described above in connection with the acids. 2-hydroxypiperidine apparently is only a theoretical compound and accordingly is not employed.

The reaction is preferably carried out by contacting the N-substituted piperidine carboxylic acid as an ester with an N-substituted piperidine alcohol in the presence of an inert neutral solvent such as n-hexane and methylcyclohexane. In this way transesterification is effected and the desired product is produced. A small amount of an alkali metal alkoxide, such as sodium methoxide, is generally added to catalyse the reaction. About equimolar amounts of reactants are used to avoid unreacted material after reaction is completed. Elevated temperatures such as the reflux temperature of the mixture are ordinarily used to effect the reaction without undue delay. When a lower alkyl ester of an N-substituted piperidine carboxylic acid is used as a reactant an alcohol forms as the reaction proceeds. This alcohol distills off at the reflux temperature. When the theoretical amount of alcohol is recovered the reaction may be considered completed. The desired product is recovered from the reaction mixture by fractional distillation.

By following the described procedure compounds such as 1-(N-methyl-3′-piperidyl)-methyl-N-methyl-nipecotate, 2 - (N-ethyl-3-piperidyl) - isopropyl-N-ethyl - nipecotate, 2 - (N - benzyl-3-piperidyl) - ethyl-N-benzyl-nipecotate, 7-(N-methyl-3-piperidyl)-heptyl-N-methylnipecotate, (N-methyl-3-piperidyl) N-methyl-nipecotate and similar position isomers from N-substituted pipecolic and isonipecotic acids may be produced. Such compounds are high boiling oils.

Acid addition salts of these and other such compounds included within the scope of this invention are produced by contacting them with a suitable acid such as a mineral acid like sulfuric acid or hydrochloric acid, or organic acids like formic acid, citric acid and so on. Up to two moles of acid may add to a mole of the compound.

Quaternary ammonium salts are also readily produced by contacting the compounds with alkyl and aralkyl esters of mineral and organic acids, preferably in the presence of a suitable organic solvent. Alkyl halides such as methyl chloride, ethyl bromide and the like, methyl sulfate, and so on, are examples of compounds which may be used.

The acid addition salts and quaternary ammonium salts are high melting solids.

These compounds have valuable medicinal properties. Thus the quaternary ammonium salts particularly have anti-hypertensive and ganglionic blocking activity. Such compounds are administered in pharmaceutical unit dosage forms such as tablets, capsules and the like. Dosage forms are readily formulated by conventional practices in the art.

The following examples are presented to show methods of producing certain of the novel compounds included within this invention. It is understood, however, that these examples are included only for purposes of illustration, and that the invention is not to be restricted to the embodiments specifically disclosed therein.

EXAMPLE 1

*N-methyl-3-piperidylmethyl N-methylnipecotate*

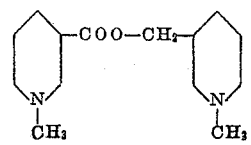

A mixture containing 31.4 g. (0.20 mole) of methyl N-methylnipecotate, 25.8 g. (0.20 mole) of N-methyl-3-hydroxymethylpiperidine, 0.5 g. of sodium methoxide and 325 cc. of n-heptane is stirred and refluxed until the theoretical amount of methanol has been collected in a Dean-Stark water separator. The n-heptane solution is clarified by filtration and the heptane is removed by distillation. The residual oil is distilled in vacuo and the product collected at 115° C. (2 mm.).

EXAMPLE 2

N-methyl-3-piperidylmethyl N-methylnipecotate dihydrochloride

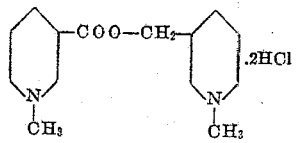

To 6.4 g. (0.025 mole) of the product of Example 1 dissolved in 65 cc. of isopropyl alcohol is added with cooling 1.8 g. (0.050 mole) of hydrogen chloride gas. The white crystalline solid is obtained by filtration; M. P. 247–249° C.

EXAMPLE 3

N-methyl-3-piperidyl N-methylnipecotate

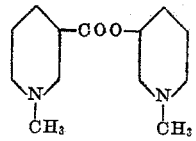

This product is prepared by reacting 31.4 g. (0.20 mole) of methyl N-methylnipecotate and 23.0 g. (0.20 mole) of N-methyl-3-hydroxypiperidine according to the procedure of Example 1; B. P. 139–140° C. (4 mm.).

EXAMPLE 4

N-methyl-3-piperidyl N-methylnipecotate dimethobromide

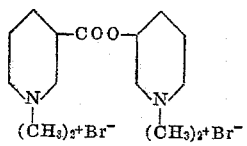

0.050 mole of N-methyl-3-piperidyl N-methylnipecotate is dissolved in 75 cc. of isopropyl alcohol and 0.20 mole of methyl bromide is added. After refluxing for three hours the solution is cooled. The desired crystalline product precipitates out and is isolated by filtration; M. P. 226–227° C.

Various changes and modifications of the invention can be made and, to the extent that such variations incorporate the spirit of this invention, they are intended to be included within the scope of the appended claims.

What is claimed is:

1. A product of the group consisting of compounds having the formulae

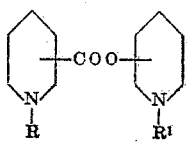

and

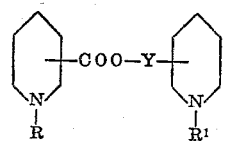

wherein R and $R^1$ are members of the group consisting of lower alkyl and monocyclic aryl-lower alkyl groups and Y is a lower alkylene group, and non-toxic acid addition and quaternary ammonium salts thereof.

2. (N - lower alkyl-3-piperidyl) - N-lower alkyl-nipecotate.

3. (N-lower alkyl-3'-piperidyl) - lower alkyl-N-lower alkyl-nipecotate.

4. 1 - (N-methyl-3'-piperidyl) - methyl-N-methylnipecotate.

5. (N-methyl-3-piperidyl) N-methyl-nipecotate.

6. 2 - (N-ethyl - 3' - piperidyl) - isopropyl - N - ethyl-nipecotate.

7. 7 - (N - methyl - 3' - piperidyl) - heptyl - N - methyl-nipecotate.

8. The process which comprises reacting a compound of the formula

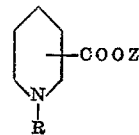

with a member of the group consisting of compounds having the formulae

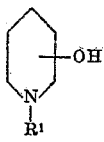

and

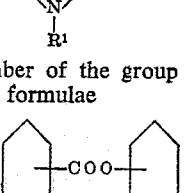

to produce a member of the group consisting of compounds having the formulae

and

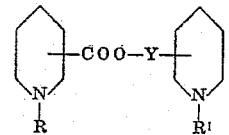

wherein R and $R^1$ are members of the group consisting of lower alkyl and monocyclic aryl-lower alkyl groups and Y and Z are lower alkylene groups.

No references cited.